(12) United States Patent
Shinohara et al.

(10) Patent No.: US 11,522,995 B2
(45) Date of Patent: Dec. 6, 2022

(54) NUMBER MANAGEMENT SYSTEM, NUMBER MANAGEMENT METHOD, AND NUMBER MANAGEMENT DEVICE

(71) Applicant: Nippon Telegraph and Telephone Corporation, Tokyo (JP)

(72) Inventors: Kenta Shinohara, Tokyo (JP); Masayuki Akutsu, Tokyo (JP); Hideki Shina, Tokyo (JP); Noritaka Horikome, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 56 days.

(21) Appl. No.: 17/253,026

(22) PCT Filed: Jun. 21, 2019

(86) PCT No.: PCT/JP2019/024674
§ 371 (c)(1),
(2) Date: Dec. 16, 2020

(87) PCT Pub. No.: WO2020/004252
PCT Pub. Date: Jan. 2, 2020

(65) Prior Publication Data
US 2021/0120125 A1    Apr. 22, 2021

(30) Foreign Application Priority Data
Jun. 25, 2018 (JP) .............................. JP2018-119757

(51) Int. Cl.
| | |
|---|---|
| *H04M 3/00* | (2006.01) |
| *H04M 5/00* | (2006.01) |
| *H04L 12/66* | (2006.01) |
| *H04M 3/42* | (2006.01) |
| *H04L 9/32* | (2006.01) |
| *H04M 7/00* | (2006.01) |
| *H04L 9/00* | (2022.01) |

(52) U.S. Cl.
CPC ...... *H04M 3/42297* (2013.01); *H04L 9/3236* (2013.01); *H04M 7/0075* (2013.01); *H04L 9/50* (2022.05)

(58) Field of Classification Search
CPC .............. H04L 61/157; H04L 65/1016; H04L 29/12594; H04L 61/1511; H04L 29/06;
(Continued)

(56) References Cited

U.S. PATENT DOCUMENTS

2005/0220287 A1* 10/2005 Aures .................... H04Q 3/005
379/221.13
2007/0286379 A1* 12/2007 Wiatrowski ...... H04M 3/42297
379/201.01
(Continued)

FOREIGN PATENT DOCUMENTS

| JP | 2017-2.12659 | 11/2017 |
|---|---|---|
| JP | 2017-200196 | 11/2017 |
| WO | WO 2018/020943 | 2/2018 |

OTHER PUBLICATIONS

[No Author Listed], "About Handling Number Portability," Ministry of Internal Affairs and Communications, Jul 28, 2016, 43 pages (with English Translation).
(Continued)

*Primary Examiner* — Kharye Pope
(74) *Attorney, Agent, or Firm* — Fish & Richardson P.C.

(57) ABSTRACT

Each of number management devices of a number management system includes a request reception unit configured to receive a number update request including number portability information, a transaction generation unit configured to generate a transaction for the received number portability information, a block proposal unit configured to acquire each of transactions generated in response to a plurality of number update requests, generate a block to be newly proposed, and transmit the generated block to be proposed
(Continued)

to each of the plurality of number management devices, and a block approval unit configured to approve the block to be proposed by confirming a predetermined normal state of the block to be proposed and store the block to be proposed in a storage unit, with the block to be proposed connected to the block stored as the blockchain.

6 Claims, 8 Drawing Sheets

(58) Field of Classification Search
CPC . H04L 61/308; H04L 61/10; H04L 29/12018; H04M 3/42297; H04M 7/006; H04M 7/128; H04M 3/4228; H04M 7/0075; H04M 3/5191; H04M 7/126; H04M 15/56
USPC .......... 370/352, 401, 356, 351, 389; 379/221.13, 220.01, 221.08
See application file for complete search history.

(56) References Cited

U.S. PATENT DOCUMENTS

| | | | | |
|---|---|---|---|---|
| 2009/0003388 A1* | 1/2009 | Florkey | .................. | H04Q 3/005 |
| | | | | 370/503 |
| 2011/0111756 A1* | 5/2011 | Imbimbo | .............. | H04L 63/308 |
| | | | | 455/435.1 |
| 2014/0273965 A1* | 9/2014 | Raleigh | .................. | H04L 63/062 |
| | | | | 455/411 |
| 2016/0198034 A1* | 7/2016 | Miranda | .................. | H04W 4/50 |
| | | | | 455/566 |
| 2018/0046992 A1 | 2/2018 | Hanrahan et al. | | |
| 2019/0081800 A1* | 3/2019 | Uhr | .......................... | G06F 21/45 |
| 2019/0130394 A1* | 5/2019 | Stallman | ............... | H04L 9/3239 |
| 2019/0261165 A1* | 8/2019 | Subramaniam | ......... | H04W 8/28 |
| 2019/0268466 A1* | 8/2019 | Inoue | .................... | H04L 9/0637 |
| 2019/0340267 A1* | 11/2019 | Vo | ........................ | G06F 16/2365 |
| 2019/0361731 A1* | 11/2019 | Qiu | ........................ | G06F 9/4837 |
| 2019/0386817 A1* | 12/2019 | Carson | .................... | G06F 21/64 |

OTHER PUBLICATIONS

[No Author Listed], "JJ-90.31 Common interconnection interlace for carrier ENUM," The Telecommunication Technology Committee, Aug. 27, 2015, 46 pages (with English Translation).

Developer.ibm.com, [online], "Blockchain for the first time," Sep. 15, 2016, retrieved on Oct. 22, 2020, retrieved from URL<https://developer.ibm.com/ip/technologies/blockchain/tutorials/j-cl-blockchain-basics-bluemix/>, 60 pages (with English Translation).

Goranovic et al., "Blockchain applications in microgrids an overview of current projects and concepts." 43rd Annual Conference of the IEEE Industrial Electronics Society. Dec. 18, 2017, pp. 6153-6158.

* cited by examiner

NUMBER MANAGEMENT SYSTEM, NUMBER MANAGEMENT METHOD, AND NUMBER MANAGEMENT DEVICE

TECHNICAL FIELD

The present invention relates to a number management system, a number management method, and a number management device utilizing blockchain technology to realize number portability in a telephone network.

BACKGROUND ART

In the related art, an E.164 Number Mapping (ENUM) system has been proposed as a mechanism with Which a device (such as a session initiation protocol (SIP) server) in a carrier network performs association between a telephone number and a uniform resource identifier (URI) in an Internet protocol (IP) network. In an FNUM system, an SIP server installed in a carrier network inquires about information on a connection destination (such as an IP address or a domain name) for a telephone number of a connection destination terminal (such as an IP phone) to an ENUM server and performs routing on the basis of the connection destination information (see Non Patent Literature 1).

Further, a number portability scheme in which a fixed telephone number is freely carried between carriers in an IP network with transition from a public switched telephone network (PSIN) to the IP network is being studied (see Non Patent Literature 2).

In the number portability scheme described in Non Patent Literature 2, a number database (a number DB) for centrally managing number portability information of each carrier is included in the ENUM server (an ENUM authority server). The SIP server of each carrier accesses the ENUM server of the carrier to which the SIP server belongs, resolves whether or not each telephone number has moved (been ported out) to another network, acquires information on the connection destination (connection destination information), and performs communication.

Figure 8:
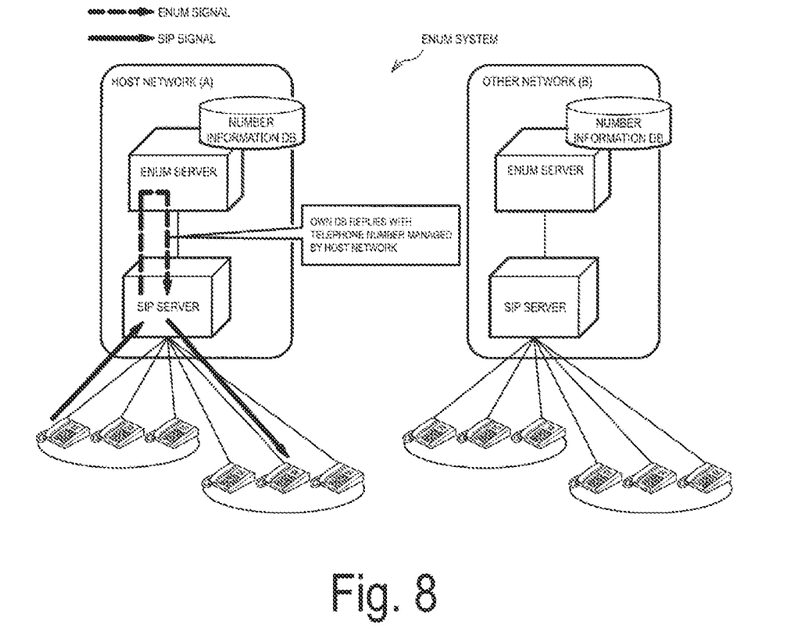
FIG. 8 is a diagram illustrating an overview of a number resolution process (a number of a host network) in an ENUM system of the related art.
Figure 9:
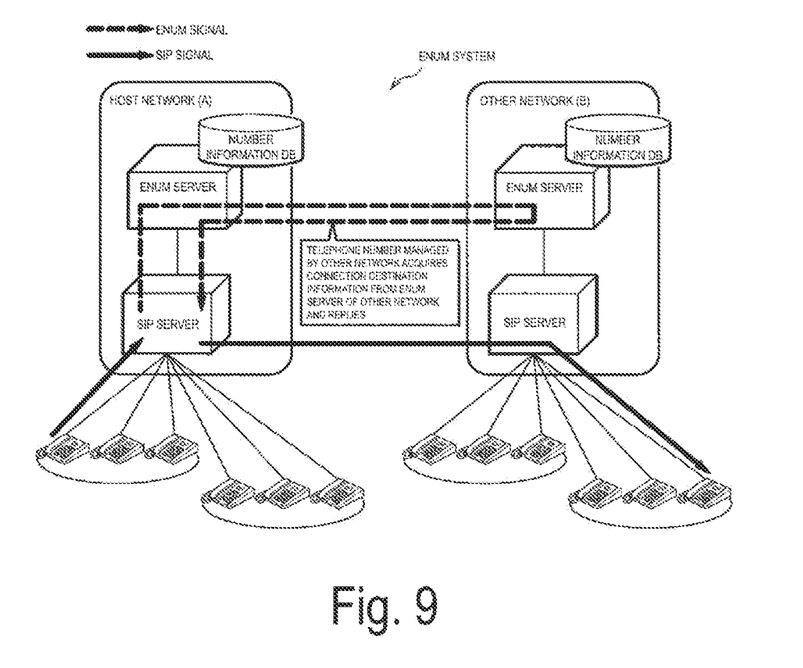
FIG. 9 is a diagram illustrating an overview of a number resolution process (an inquiry to another network) in the ENUM system of the related art.

Specifically, when a telephone number (an incoming number) assigned to a request from the SIP server is an inquiry of a telephone number managed by the host network, the ENUM server replies with connection destination information from a number DB of the ENUM server (see FIG. 8). On the other hand, when the telephone number assigned to the request is a telephone number managed by an ENUM server of another network, the ENUM server sends a request to the ENUM server of the other network that manages the telephone number and replies to a requesting source with the obtained connection destination information (see FIG. 9).

Thus, in current telephone networks in Japan, an ENUM system is employed to realize number portability. As a specific mechanism, a "calling side DB reference scheme," that is, a scheme in which a carrier that is a calling source realizes connection of a call even when referring to a DB (a number database) of another carrier is employed as a routing scheme. Further, a "company-owned individual DB scheme," that is, a scheme in which each company has a number DB is employed as a database scheme.

On the other hand, blockchain technology is known as a scheme for distributed management of data (see Non Patent Literature 3). In a blockchain, a number of computers constituting a distributed network share records such as transaction information and link and store correct information like a chain. Using blockchain technology, it is possible to realize distributed processing and management that is very difficult to tamper with, and to reduce management costs as compared to a centralized processing type infrastructure in the related art.

CITATION LIST

Non Patent Literature

Non Patent Literature 1: "TTC Standard JJ-90.31 Common Interconnection Interface for Carrier ENUM," Information and Communication Technology Committee in General Incorporated Association, Aug. 27, 2015

Non Patent Literature 2: "Handling of Number Portability," [online], General Communication Infrastructure Bureau of Ministry of Internal Affairs and Communications, Jul. 28, 2016 [Retrieved Jun. 13, 2018], Internet<URL: http://www.soumu.go.jp/main_content/000433169.pdf>

Non Patent Literature 3: Satomi Hirano, "Initial Blockchain," [online], IBM, Sep. 15, 2016, [Retrieved Jun. 13, 2018], Internet https://www.ibm.com/developerworks/jp/cloud/library/j_cl-blockchain-basics-bluernix/>

SUMMARY OF THE INVENTION

Technical Problem

In the ENUM system of the related art, the "calling side DB reference scheme" is employed as the routing scheme, and the "company-owned individual DB scheme" is employed as the database scheme, as described above. However, in a number portability scheme in which this ENUM system is employed, there is a problem in that, when an ENUM server of a certain carrier fails, number resolution for a range of numbers managed by the carrier cannot be performed.

Further, currently, a form is taken in which only a large-scale carrier holds an ENUM server, and a small-scale carrier allows the ENUM of the large-scale carrier to manage connection destination information corresponding to each telephone number (hereinafter referred to as "number information"), which has the following problems.

(1) High reliability is required to construct the ENUM system, Thus, costs are high and a burden is large for a small-scale carrier.
(2) When a small-scale carrier wishes to update data, it needs to request a large-scale carrier to change the data. Thus, there is no guarantee that the data can be updated in real time.
(3) When a carrier withdraws, there is concern that the portability destination of numbers managed by the carrier may become impossible to resolve.

The present invention has been made in view of such a background and an object of the present invention is to provide a number management system, a number management method, and a number management device that improve availability of number portability information that is used in an ENUM system.

Means for Solving the Problem

In order to solve the problem described above, the invention according to claim 1 is a number management system including a plurality of communicatively connected number management devices and configured to manage, as a blockchain, number portability information including a telephone number and connection destination information of the telephone number, in which each of the number management devices includes: a request reception unit configured to receive a number update request including the number portability information, a transaction generation unit configured to generate a transaction for managing the received number portability information in the blockchain, a block proposal unit configured to acquire each of transactions generated in response to a plurality of the number update requests, generate a block to be newly proposed including a transaction group obtained by aggregating the plurality of acquired transactions, and transmit the generated block to be proposed to each of the plurality of number management devices constituting the blockchain, and a block approval unit configured to receive the block to be proposed, approve the block to be proposed by confirming a predetermined normal state of the block to be proposed, and store the block to be proposed in a storage unit, with the block to be proposed connected to the block stored as the blockchain, The invention according to claim 5 is a number management method for a number management system including a plurality of communicatively connected number management devices and configured to manage, as a blockchain, number portability information including a telephone number and connection destination information of the telephone number, in which each of the number management devices executes receiving a number update request including the number portability information, and generating a transaction for managing the received number portability information in the blockchain and transmitting the generated transaction to one of the plurality of number management devices determined on the basis of a predetermined logic, the one of the plurality of number management devices executes receiving each of transactions generated in response to a plurality of the number update requests, generating a block to be newly proposed including a transaction group obtained by aggregating the plurality of received transactions, and transmitting the generated block to be proposed to each of the plurality of number management devices constituting the blockchain, and each of the plurality of number management devices executes receiving the block to be proposed, approving the block to be proposed by confirming a predetermined normal state of the block to be proposed, and storing the block to be proposed in a storage unit, with the block to be proposed connected to the block stored as the blockchain.

The invention according to claim 7 is a number management device of a number management system including a plurality of communicatively connected number management devices and configured to manage, as a blockchain, number portability information including a telephone number and connection destination information of the telephone number, wherein the number management device includes: a request reception unit configured to receive a number update request including the number portability information, a transaction generation unit configured to generate a transaction for managing the received number portability information in the blockchain, a block proposal unit configured to acquire each of transactions generated in response to a plurality of the number update requests, generate a block to be newly proposed including a transaction group obtained by aggregating the plurality of acquired transactions, and transmit the generated block to be proposed to each of the plurality of number management devices constituting the blockchain, and a block approval unit configured to receive the block to be proposed, approve the block to be proposed by confirming a predetermined normal state of the block to be proposed, and store the block to be proposed in a storage unit, with the block to be proposed connected to the block stored as the blockchain.

Thus, each number management device (blockchain constitution device) of the number management system can store not only the number portability information on the telephone numbers managed by the number management device, but also the number portability information of all members (such as the carriers) that participate in the blockchain. Thus, it is possible to improve availability of the number portability information that is used in the ENUM system.

The invention according to claim 2 is the number management system according to claim 1, in which the block proposal unit calculates a hash value by using the transaction group included in a most recent block among the blocks stored as the blockchain in the storage unit, and generates the block to be proposed further including the calculated hash value and when the block approval unit receives the block to be proposed, the block approval unit calculates a hash value using the transaction group included in the most recent block stored in the storage unit of the number management device to which the block approval unit belongs, and confirms the predetermined normal state through a match between the calculated hash value and a hash value included in the received block to be proposed.

Thus, the block approval unit of each number management device can reliably verify that the block to be proposed, for example, has not been tampered with, but has been successfully proposed.

The invention according to claim 3 is the number management system according to claim 1 or 2, in which a representative number management device is set from among the plurality of number management devices, the representative number management device includes the block proposal unit and the number management devices other than the representative number management device do not include the block proposal unit, and when the transaction generation unit of one of the other number management devices generates the transaction, the transaction generation unit transmits the transaction to the block proposal unit of the representative number management device.

The invention according to claim 6 is a number management method for a number management system including a plurality of communicatively connected number management devices and configured to manage, as a blockchain, number portability information including a telephone number and connection destination information of the telephone number, in which a representative number management device is set from among the plurality of number management devices, the number management device executes receiving a number update request including the number portability information, and generating a transaction for managing the received number portability information in the blockchain and transmitting the generated transaction to the representative number management device, the representative number management devices executes receiving each of transactions generated in response to a plurality of the number update requests, generating a block to be newly proposed including a transaction group obtained by aggregating the plurality of received transactions, and transmitting the generated block to be proposed to each of the plurality of number management devices constituting the blockchain, and each of the plurality of number management devices executes receiving the block to be proposed, approving the block to be proposed by confirming a predetermined normal state of the block to be proposed, and storing the block to be proposed in a storage unit, with the block to be proposed connected to the block stored as the blockchain.

Thus, it is not necessary for the block proposal unit to be included in number management devices other than the representative number management device. Thus, there is no need to deal with the problem of agreement formation of a distributive system caused when each number management device includes the block proposal unit, that is, when a plurality of block proposal units are present in a blockchain. The problem of agreement formation of the distributive system is a problem of ordering properties when a plurality of block proposal units generate blocks at the same time, a problem of consistency of blocks stored in each number management device, a problem of atomic properties such as a process of discarding all processes and returning to an initial state when some number management devices have failed, or the like. When the block proposal unit is included only in the representative number management device, it is possible to reduce processing load and communication load in an entire system because it is not necessary to deal with the problem of agreement formation of the distributive system.

The invention according to claim 4 is the number management system according to claim 1 or 2, in which each of the plurality of number management devices is communicatively connected to an E.164 Number Mapping server (ENUM) of a carrier to which the number management device belongs, and each of the plurality of number management devices further includes a number portability information transmission unit configured to transmit, to the ENUM server, the number portability information indicated by the transaction group included in the block to be proposed stored in the storage unit.

Thus, each number management device can reflect the updated number portability information in the number database of the ENUM server of the carrier to which the number management device belongs.

Effects of the Invention

According to the present invention, it is possible to provide a number management system, a number management method, and a number management device that improve availability of number portability information that is used in an ENUM system.

DESCRIPTION OF EMBODIMENTS

A number management system 1 in a mode for carrying out the present invention (hereinafter referred to as the present embodiment) and other components will be described below.

Figure 1:
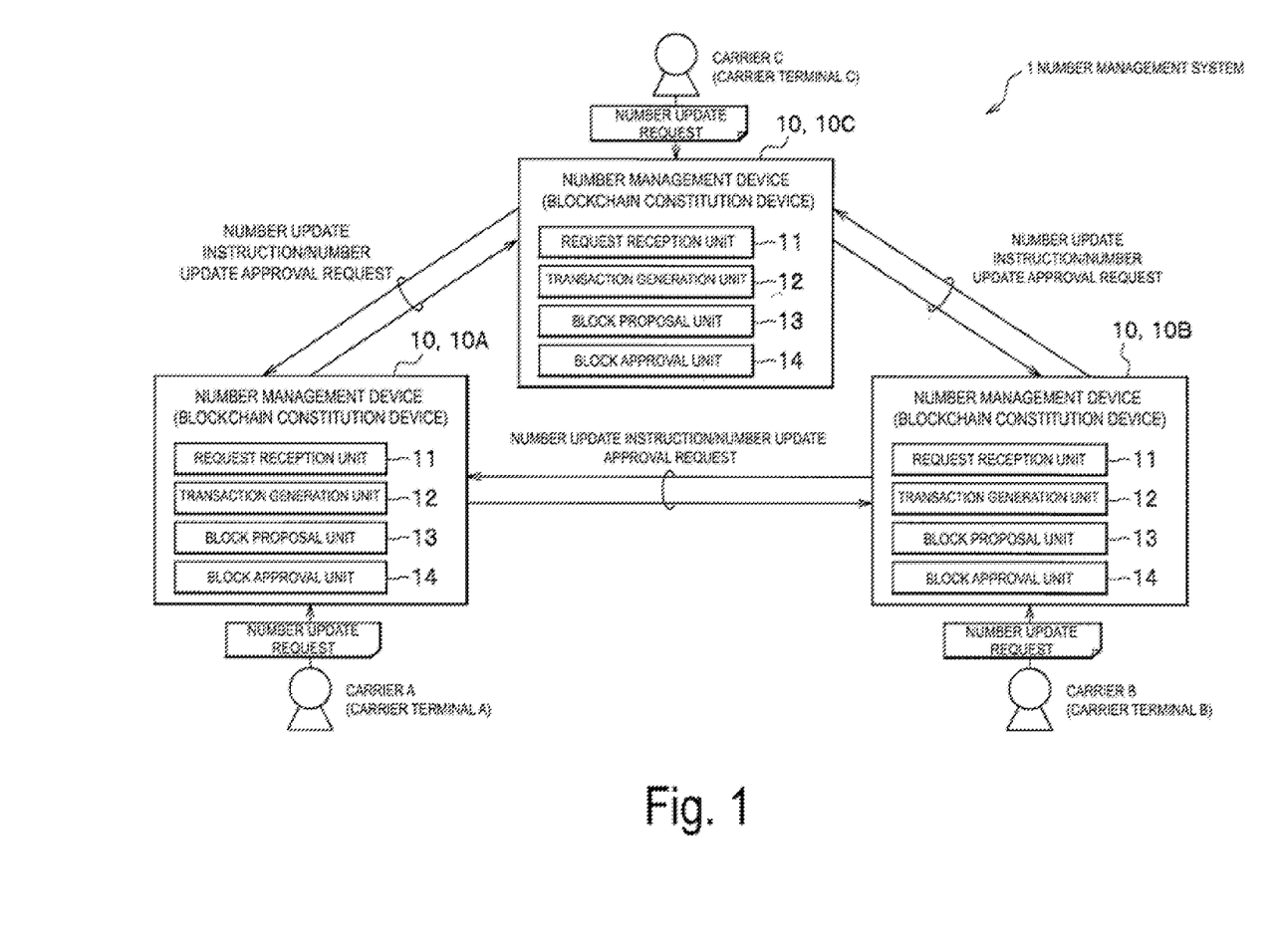
FIG. 1 is a diagram illustrating an overall configuration of a number management system according to the present embodiment.

FIG. 1 is a diagram illustrating an overall configuration of the number management system 1 according to the present embodiment. As illustrated in FIG. 1, the number management system 1 has a configuration in which respective number management devices 10 included as blockchain constitution devices in respective carriers (referred to as "carrier" in each drawing) are communicatively connected to each other. In FIG. 1, a number management device (blockchain constitution device) 10A included in a carrier A, a number management device (blockchain constitution device) 10B included in a carrier B, and a number management device (blockchain constitution device) 10C included in a carrier C are illustrated by way of example, but the number of number management devices 10 is not limited thereto and a plurality of number management devices (blockchain constitution devices) 10 may be communicatively connected to each other.

Information managed in this number management system 1 is information on number portability (hereinafter referred to as "number portability information"). Number portability is a mechanism in which, even when a user changes a carrier in use, the user can use a service of a carrier after the change, with a telephone number remaining the same. Each carrier performs number resolution by holding the number portability information with connection destination information in number information (telephone number and connection destination information corresponding to the telephone number) of its own company set as information updated with connection destination information addressed to another company. In the number management system 1, number portability information of all of carders participating in the blockchain is stored as a blockchain in the number management device 10 of each carrier.

In the present embodiment, the number management device 10 participating in the blockchain is based on a Permissioned type blockchain in which services using a blockchain are used by limited members, rather than a public blockchain in which anyone can participate, such as a blockchain used in financial transactions. For example, a member participating in the blockchain is a carrier to which a telephone number is issued by the Ministry of Internal Affairs and Communications. However, the members are not limited to such specific carriers and may include specific individuals as shown in modification example 3 to be described below.

Number Management Device

Next, the number management device 10 according to the present embodiment will be described. The number management device 10 is a blockchain constitution device that manages the number portability information of members (the respective carriers) participating in a blockchain. This number management device 10 is connected to the number management device 10 of another carrier participating in the blockchain and is connected to a system (for example, a carrier terminal) of the carrier. The respective number management devices 10 (10A, 10B, and 10C) have the same function, which will be described below.

The number management device 10 includes a control unit, an input and output unit, and a storage unit (none of which are illustrated).

The communication unit includes a communication interface that performs transmission and reception of information to and from another number management device 10, and a carrier terminal of the carrier to which the communication unit belongs.

Further, the storage unit (a storage means) includes a hard disk, flash memory, or random access memory (RAM), for example. Number portability information that is information obtained by changing the connection destination information in the number information (the telephone number and the connection destination information corresponding to the telephone number) into that of another carrier is stored as a blockchain in this storage unit (see FIGS. 2 and 3 to be described below).

The control unit includes a request reception unit 11, a transaction generation unit 12, a block proposal unit 13, and a block approval unit 14, as illustrated in FIG. 1.

The request reception unit 11 receives a number update request from a carrier (a carrier terminal) or the like via the input and output unit. A telephone number (example: 0312345678) that is a number portability target, and connection destination information of another carrier that is a change destination of the telephone number (hereinafter also referred to as "accommodation carrier information") (e.g.: 0312345678@abc.ne.jp) are included in this number update request. The telephone number and the accommodation carrier information, which is the connection destination information that is the change destination of the telephone number, constitute the number portability information (see FIGS. 2 and 3).

When the request reception unit 11 receives the number update request, the request reception unit 11 generates a number update proposal including the telephone number and the accommodation carrier information, and outputs the number update proposal to the transaction generation unit 12.

Further, when the request reception unit 11 receives a transaction (a transaction generated as information for managing and storing the number portability information in a blockchain) generated by the transaction generation unit 12, the request reception unit 11 transmits a number update instruction including the received transaction to the block proposal unit 13 of the number management device 10 determined on the basis of a predetermined logic (a block proposal unit selection logic) among the number management devices 10 constituting the blockchain. Here, the predetermined logic may set, for example, any number management device 10 (which has high processing performance and is adjacent in terms of distance, for example) in advance or may randomly determine the number management device 10. Further, the predetermined logic may be included as a candidate for determining the block proposal unit 13 of the number management device 10.

When the transaction generation unit 12 receives the number update proposal, the transaction generation unit 12 confirms a normal state of the information on the telephone number and accommodation carrier information (the number portability information), which is the connection destination information of a change destination of the telephone number, which is proposal content of the number update proposal.

The confirmation of the normal stale performed by the transaction generation unit 12 is, for example, for verifying whether or not the telephone number is in a prescribed format (such as the number of digits) and whether or not the accommodation carrier information is in a prescribed format.

The transaction generation unit 12 generates a transaction in which the number portability information is managed and stored in a blockchain when the confirmation of the normal state can be performed. The transaction generation unit 12 outputs a number update proposal response including the generated transaction to the request reception unit 11. The transaction generation unit 12 may determine the block proposal unit 13 of the number management device 10 of any of the respective number management devices 10 constituting the blockchain based on the predetermined logic (the block proposal unit selection logic) and transmit a number update instruction including the generated transaction to the determined block proposal unit 13, instead of outputting the generated transaction to the request reception unit 11.

The block proposal unit 13 aggregates the number update instructions received from the respective number management devices 10 constituting the blockchain to generate a block including a plurality of transactions (hereinafter referred to as a "transaction group"). This block includes aggregated transactions (a transaction group), and a hash value (a "hash value of a previous block" to be described below) calculated using a transaction group of a block that is most recent at a current point in time among blocks stored as a blockchain in a storage unit (not illustrated).

Figure 2:
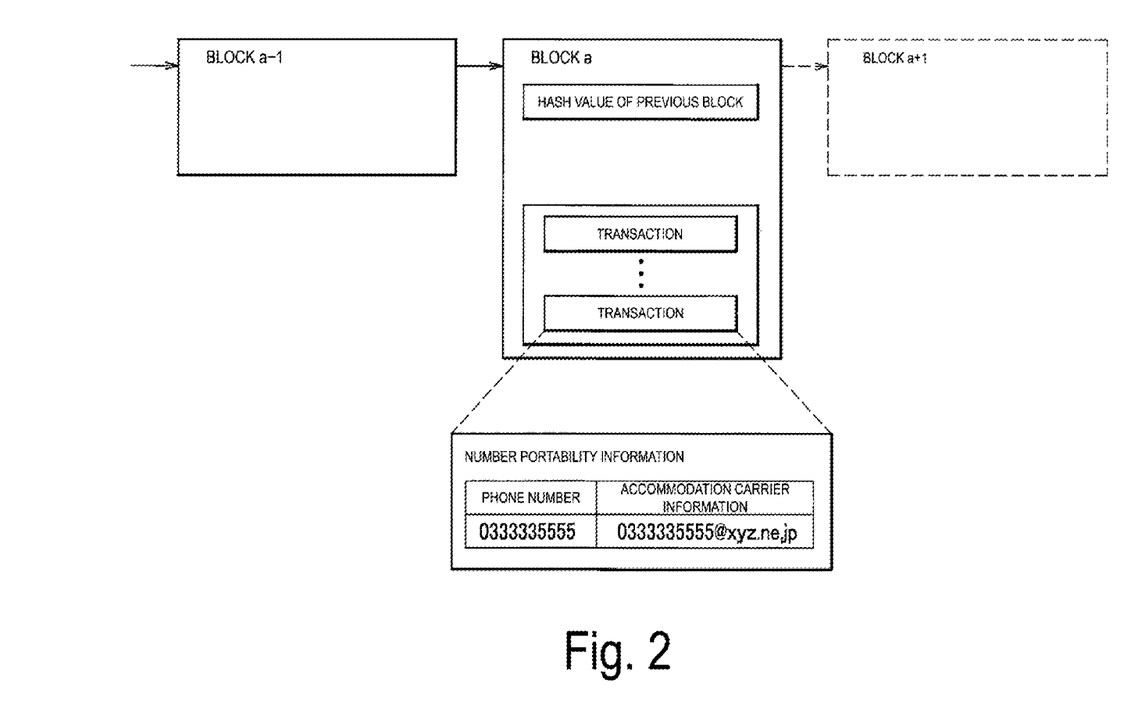
FIG. 2 is a diagram illustrating blocks stored as a blockchain in a storage unit of each number management device.

FIG. 2 is a diagram illustrating blocks stored as a blockchain in a storage unit of each number management device 10.

Information on the transaction group and information on the "hash value of the previous block" are stored in each of the blocks. In the example illustrated in FIG. 2, a hash value (the hash value of the previous block) is a value calculated by using a hash function for a transaction group of a block a−1 that is a block connected immediately before. The hash value and information on the most recent transaction group at that point in time are stored in a block a that is most recent at the current point in time (that was last connected).

The block proposal unit 13 calculates a hash value of the transaction group for the most recent block (block a) by using the hash function when generating a block to be proposed. The block proposal unit 13 generates a block including the calculated hash value (the hash value of the previous block) and the newly aggregated transaction group as a block (block a+1) to be proposed.

When the block proposal unit 13 newly generates the block (block a+1) to be proposed, the block proposal unit 13 transmits a number update approval request including the block to the block approval unit 14 of each of the number management devices 10 constituting the blockchain.

Referring back to FIG. 1, when the block approval unit 14 receives the number update approval request, the block approval unit 14 confirms the normal state of the block included in the number update approval request. This confirmation of the normal state, for example, is performed as follows. The block approval unit 14 calculates the hash value by using the transaction group in the most recent block (block a) of the blockchain stored in the storage unit of the number management device 10. The block approval unit 14 determines whether the hash value of the previous block included in the newly proposed block a+1 in the number update approval request matches the calculated hash value.

Figure 3:
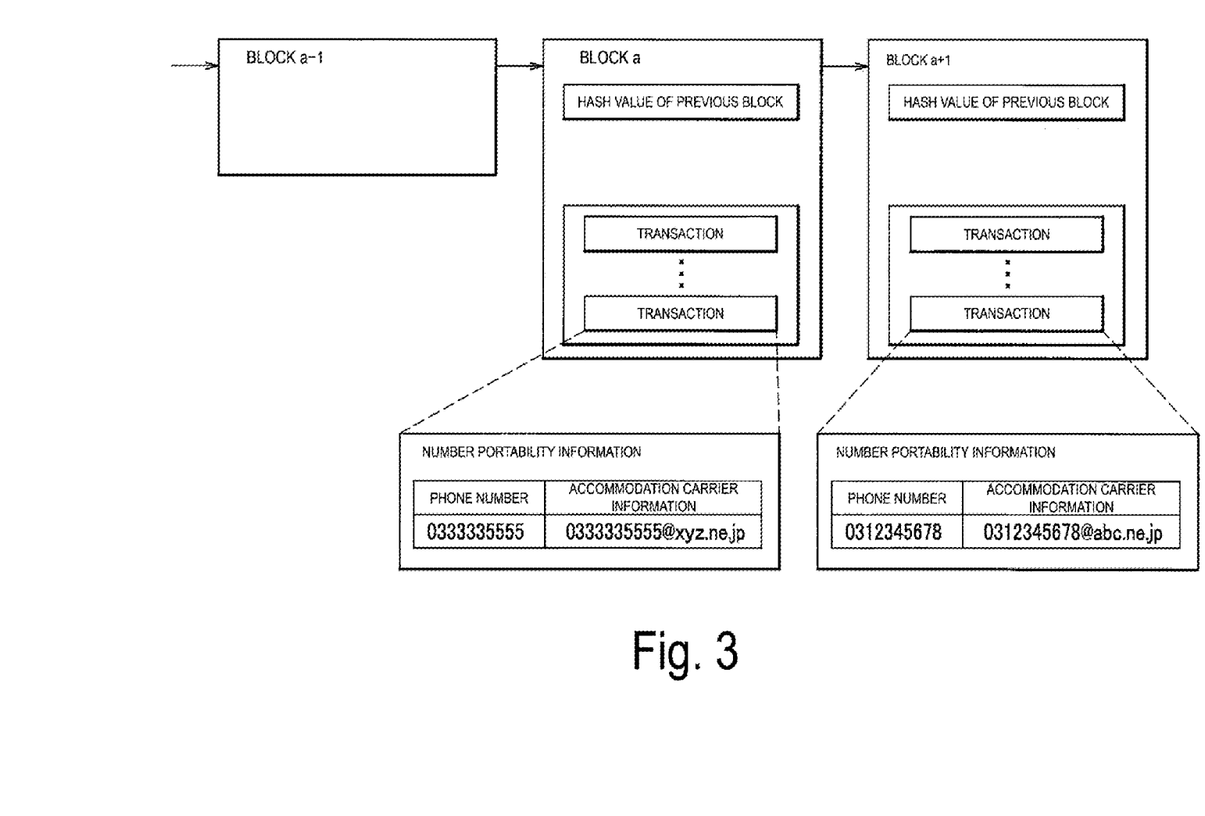
FIG. 3 is a diagram illustrating blocks stored as a blockchain in a storage unit of each number management device.

When the hash values match, the block approval unit 14 approves the block as a normal block, and stores the block as the next block (block a+1) in the blockchain, with the block connected to the block a (see FIG. 3).

Through the block approval unit 14 of each of the number management devices 10 constituting the blockchain approving the proposed block (confirming the normal state), the same transaction (the number portability information) is stored in all of the number management devices 10.

Process of Number Management System

Next, a process flow of the number management system 1 according to the present embodiment will be described.

Figure 4:
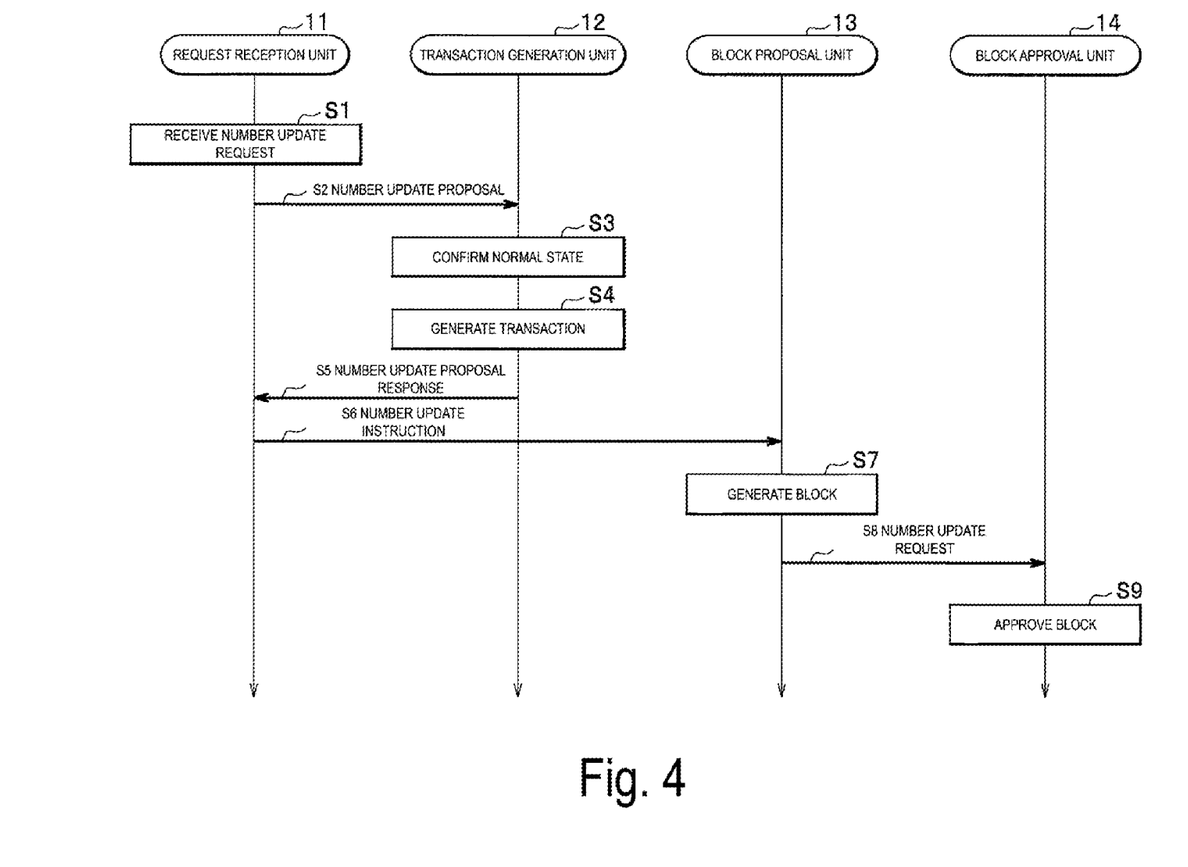
FIG. 4 is a sequence diagram illustrating a flow of a process of the number management system according to the present embodiment.

FIG. 4 is a sequence diagram illustrating a flow of a process of the number management system 1 according to the present embodiment.

First, one of the number management devices 10 constituting the number management system 1 (for example, the number management device 10A) receives a number update request from a carder (a carrier terminal) or the like (Step S1). Number portability information including a telephone number (for example, 0312345678) that is a target, and connection destination information on another carrier that is a change destination of the telephone number (hereinafter also referred to as "accommodation carrier information") (for example, 0312345678@abc.ne.jp) is included in this number update request.

The carrier (the carrier terminal) or the like may transmit the number update request to the number management device 10 belonging to the carrier or may transmit the number update request to the number management device 10 constituting a blockchain and belonging to another carrier. Thus, for example, the number update request may be transmitted from a carrier terminal A of a carrier A to a number management device 10B of a carrier B.

The request reception unit 11 of the number management device 10 that has received the number update request then extracts the number portability information (accommodation carrier information including a telephone number and a change destination) included in the number update request, and outputs the number update proposal including the number portability information to the transaction generation unit 12 of the host device (Step S2).

When the transaction generation unit 12 receives the number update proposal, the transaction generation unit 12 confirms the normal state in terms of whether or not information (number portability information) of the telephone number and the accommodation carrier information that is a change destination of the telephone number, which is proposal content of the number update proposal, matches a predetermined standard (format) (Step S3).

When the normal state can be confirmed, the transaction generation unit 12 generates a transaction in which the number portability information is managed and stored in a blockchain (Step S4). The transaction generation unit 12 outputs a number update proposal response including the generated transaction to the request reception unit 11 (Step S5). The transaction generation unit 12 ends the process when the normal state cannot be confirmed. In this case, the transaction generation unit 12 may reply to a carrier (a carrier terminal) or the like that has transmitted the number update request with an indication that the normal state cannot be confirmed, via the request reception unit 11.

Subsequently, the request reception unit 11 acquires the transaction included in the number update proposal response, and transmits a number update instruction including the acquired transaction to the block proposal unit 13 of the number management device 10 (for example, the number management device 10B) determined based on the predetermined logic (the block proposal unit selection logic) among the number management devices 11) constituting the blockchain (Step S6).

The block proposal unit 13 of the number management device 10 that has received the number update instruction aggregates the transactions included in the received number update instruction and transactions included in other received number update instructions to generate a block (the block to be proposed) including a plurality of transactions (a transaction group) (Step S7). In this case, the block proposal unit 13 calculates the hash value of the transaction group for the most recent block (the block a in FIG. 2) and includes the calculated hash value as the "hash value of the previous block" in the generated block.

The block proposal unit 13 transmits a number update approval request including the generated block (the block to be proposed) to the block approval unit 14 of each of the number management devices 10 (10A and 10C) constituting the blockchain (Step S8). In this case, the block proposal unit 13 also outputs the number update approval request to the block approval unit 14 of the host device (the number management device 10B).

When the block approval unit 14 of each number management device 10 receives the number update approval request, the block approval unit 14 of each number management device 10 confirms the normal state of the block included in the number update approval request to approval the block (Step S9). The block approval unit 14 stores the approved block as a next block (block a+1 in FIG. 3) of the blockchain stored in the host device, with the approved block connected to the block a, and ends the process.

The block approval unit 14 performs the confirmation of the normal state by, for example, determining whether or not the "hash value of the previous block" included in the block matches the hash value calculated by using the transaction group of the most recent block (block a in FIG. 2) stored in the storage unit of the host device, and confirming that the block is normal, for example, without being tampered with when the hash values match.

Thus, each of the number management devices (blockchain constitution devices) 10 of the number management system 1 according to the present embodiment can store not only the number portability information on the telephone numbers managed by the number management device, but also the number portability information of all members (such as the carriers) that participate in the blockchain. Thus, for example, even when the number management device 10 of a certain carder fails, it is possible to continue the number resolution by storing the number portability information of all the members (the carriers) participating in the blockchain in the number management devices 10 of the other carriers. Thus, the number management system 1 according to the present embodiment can improve availability of the number portability information that is used in an ENUM system.

Each of the number management devices 10 constituting the number management system 1 according to the present embodiment is configured to have a function of responding to an inquiry (request) about the connection destination information from an SIP server or the like (a number resolution function of the ENUM server) in the ENUM system.

Thus, even when any of the number management devices 10 including the function of the ENUM server fails, the individual number management device 10 including the function of the ENUM server need not have a higher degree of reliability than that of an ENUM server of an ENUM system of the related art because the number portability information of all the members participating in the blockchain is stored in the other number management devices 10. Thus, it is possible to reduce costs. Further, when the number portability information is updated, a small-scale carrier has only to transmit a number update request to any of the plurality of number management devices 10 constituting the blockchain, and thus it is not necessary to request a specific large-scale carrier to change the information. Thus, it is possible to lower an entry barrier to a telephone network service for small-scale carriers.

MODIFICATION EXAMPLE 1

Next, modification example 1 of the number management system 1 according to the present embodiment will be described.

In the number management system 1 according to the present embodiment illustrated in FIG. 1, it is possible to realize the ENUM system through the number management device 10 having a function (a number resolving function) of responding to the inquiry (request) about the connection destination information from the SIP server or the like.

On the other hand, modification example 1 is characterized in that, in a number management system 1*a* according to modification example 1 of the present embodiment, the function (the number resolving function) of responding to the inquiry (request) about the connection destination information from the SIP server or the like is configured by a device (the ENUM server) separate from the number management device 10 in order to realize the ENUM system.

Figure 5:
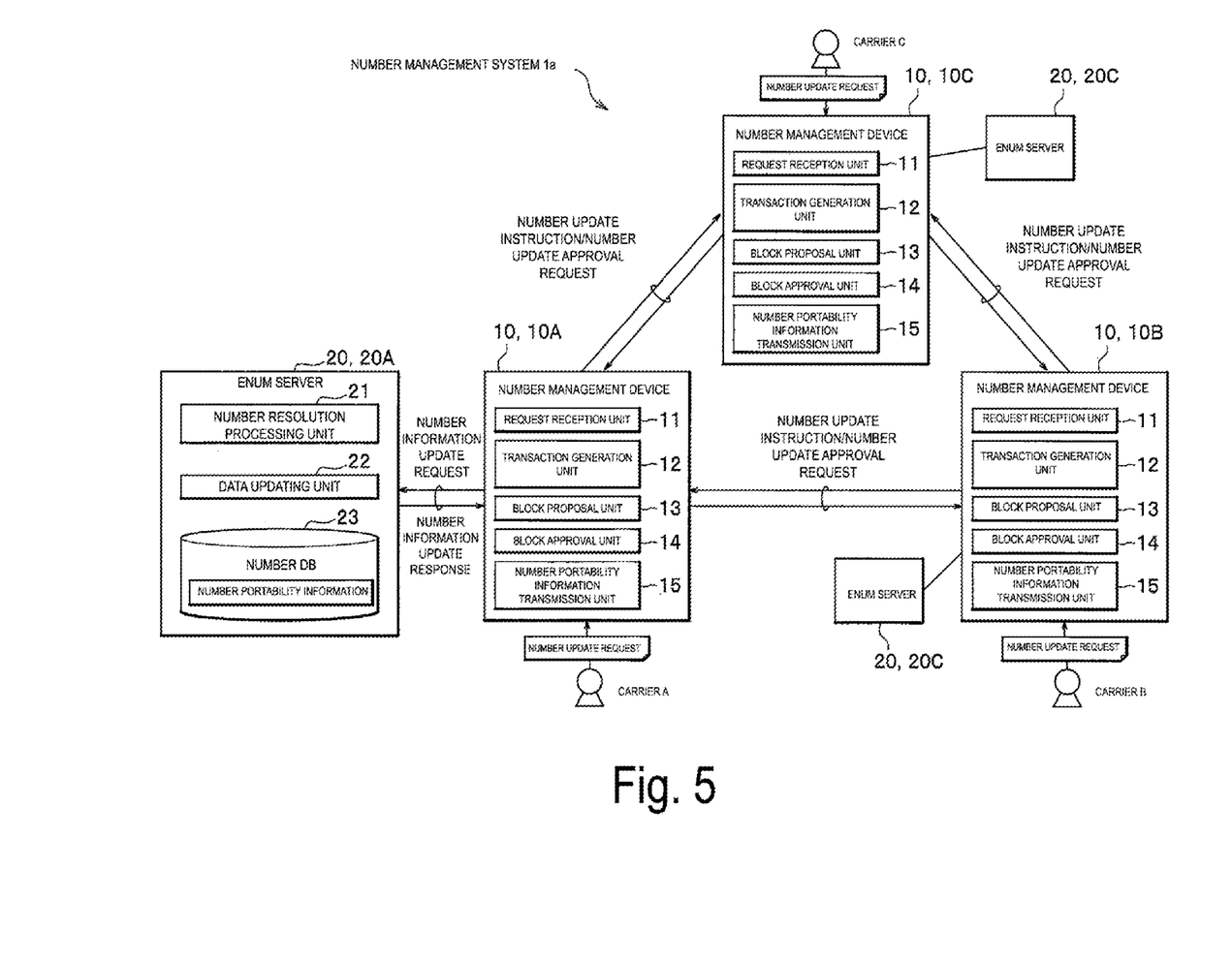
FIG. 5 is a diagram illustrating an overall configuration of an ENUM system including a number management system according to modification example 1 of the present embodiment.

FIG. 5 is a diagram illustrating an overall configuration of the number management system 1*a* according to modification example 1 of the present embodiment.

As illustrated in FIG. 5, the number management devices 10 (10A, 10B, and 10C) constituting the number management system 1*a* are connected to ENUM servers 20 (20A, 20B, and 20C) installed by respective carriers. Further, the difference between the number management device 10 illustrated in FIG. 5 and the number management device 10 of the number management system 1 illustrated in FIG. 1 is that each number management device 10 includes a number portability information transmission unit 15. Components having the same functions as in the number management device 10 illustrated in FIG. 1 are denoted by the same reference signs and names, and descriptions thereof will be omitted.

When a new block is connected to the blockchain and stored by the block approval unit 14 approving the proposed block, the number portability information transmission unit 15 extracts the number portability information, which is information on each transaction included in the newly stored block, and transmits a number information update request including the number portability information to the ENUM server 20 of the carrier to which the number portability information transmission unit 15 belongs. Further, the number portability information transmission unit 15 receives, from the ENUM server 20, a response to the number information update request, which is a number information update response indicating that the number database has been updated with the transmitted number portability information.

ENUM Server

The ENUM server 20 is a device that receives an inquiry (request) regarding the connection destination information for a telephone number of a terminal that is a connection destination from the SIP server or the like, and responds to the inquiry. The ENUM server 20 includes a number resolution processing unit 21, a data updating unit 22, and a number database (DB) 23.

The number resolution processing unit 21 receives the inquiry from the SIP server or the like, extracts the connection destination information corresponding to the telephone number indicated by the inquiry by referring to the number database 23, and replies to the SIP server or the like with the connection destination information.

The data updating unit 22 receives the number information update request from the number management device 10 connected to the data updating unit 22, and updates the number database 23 with each piece of number portability information included in the number information update request. Then, when the update of the number database 23 has been completed, the data updating unit 22 transmits a number information update response indicating that fact to the number management device 10.

Figure 6:
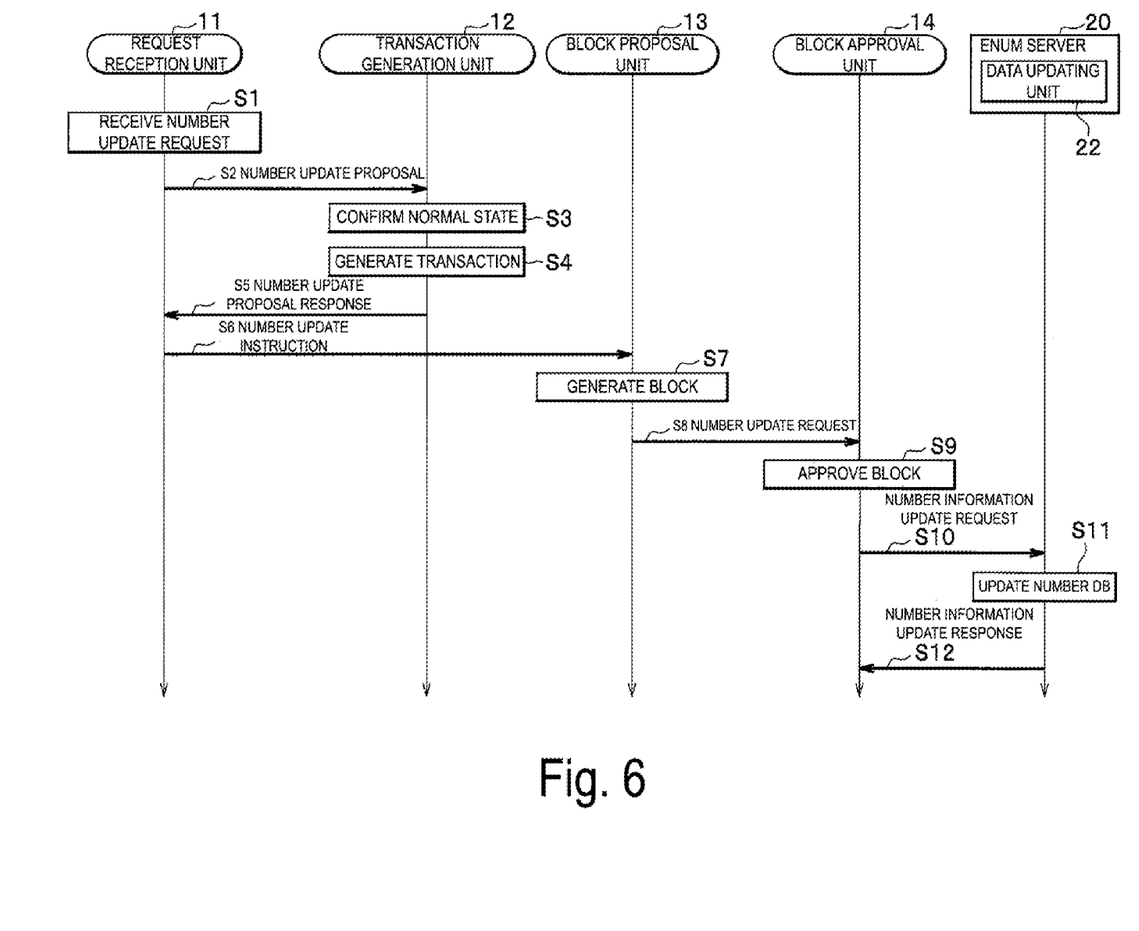
FIG. 6 is a sequence diagram illustrating a flow of a process of the ENUM system including the number management system according to modification example 1 of the present embodiment.

FIG. 6 is a sequence diagram illustrating a flow of a process of the ENUM system including the number management system 1*a* according to modification example 1 of the present embodiment.

The processes of the number management system 1 illustrated in FIG. 4 (Steps S1 to S9) are the same and description will be omitted.

When the block approval unit 14 of each of the number management devices 10 (10A, 10B, and 10C) approves the proposed block (Step S9), the number portability information transmission unit 15 (not illustrated in FIG. 6) extracts the number portability information that is information on each transaction included in the block newly stored in the blockchain. The number portability information transmission unit 15 generates the number information update request including the extracted number portability information, and transmits the number information update request to the ENUM server 20 of the carrier to which the number portability information transmission unit 15 belongs (Step S10).

Subsequently, when the number information update request is received, the data updating unit 22 of each ENUM server 20 updates the number database 23 with each piece of number portability information included in the number information update request (Step S11).

Then, when the update of the number database 23 has been completed, the data updating unit 22 of each ENUM server 20 transmits a number information update response indicating that fact to the number management device 10 (Step S12).

Thus, each number management device 10 of the number management system 1*a* may reflect the updated number portability information in the number database 23 of the ENUM server 20 of the carrier to which the number management device 10 belongs.

The data updating unit 22 of the ENUM server 20 may transmit a request for acquisition of the updated number portability information al predetermined time intervals from the data updating unit 22 and acquire each piece of number portability information from the number portability information transmission unit 15 of the number management device 10, instead of receiving the number update request from the number management device 10, and update the number database 23.

MODIFICATION EXAMPLE 2

Next, modification example 2 of the number management system 1 according to the present embodiment will be described.

Figure 7:
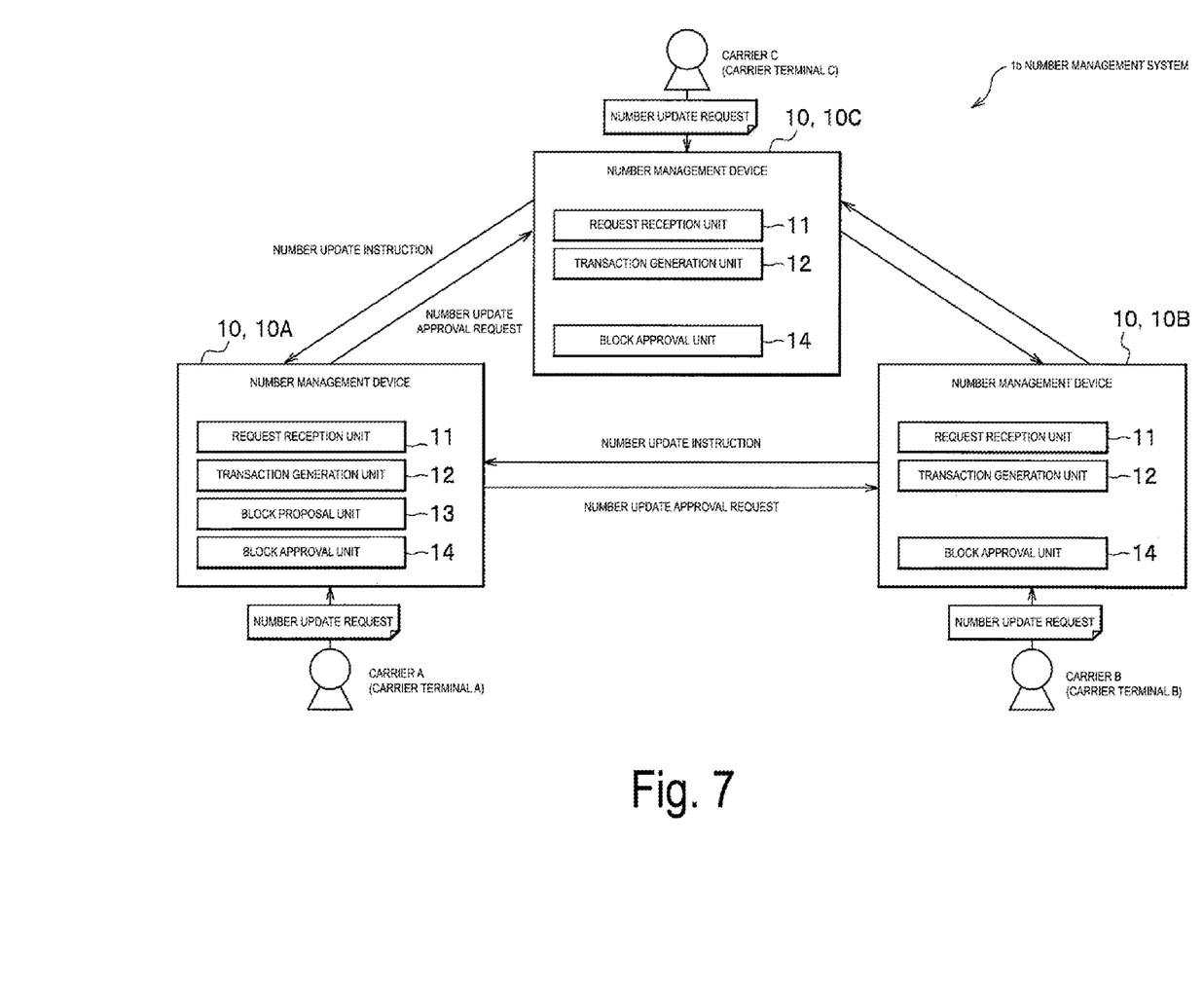
FIG. 7 is a diagram illustrating an overall configuration of a number management system according to modification example 2 of the present embodiment.

FIG. 7 is a diagram illustrating an overall configuration of a number management system 1b according to modification example 2 of the present embodiment.

In the number management system 1b, one of the number management devices 10 constituting the blockchain is set as a representative (leader) number management device 10 (the number management device 10A in FIG. 7). A configuration in which the block proposal unit 13 is included in the representative number management device 10 (10A) and the block proposal unit 13 is not included in the other number management devices 10 (10B and 10C) is adopted. Components having the same functions as in the number management device 10 illustrated in FIG. 1 are denoted by the same reference signs and names, and description thereof will be omitted.

The transaction generation unit 12 (FIG. 1) of each number management device 10 according to the present embodiment receives the number update proposal from the request reception unit 11, and generates the transaction for the number portability information. The request reception unit 11 (or the transaction generation unit 12) then transmits the number update instruction to the block proposal unit 13 of any of the number management devices 10 constituting the blockchain determined based on the predetermined logic (the block proposal unit selection logic).

On the other hand, in the number management device 10 according to modification example 2 of the present embodiment, the request reception unit 11 (or the transaction generation unit 12) of each number management device 10 (10B or 10C) transmits number update instructions to the block proposal unit 13 of the representative number management device 10 (10A), The block proposal unit 13 of the representative number management device 10 (10A) aggregates the received number update instructions to generate a block including a plurality of transactions. Subsequently, the block proposal unit 13 transmits a number update approval request including the generated block to the block approval unit 14 of each of the number management devices 10 constituting the blockchain.

When the block approval unit 14 of each number management device 10 confirms the normal state of the block included in the number update request, the block approval unit 14 of each number management device 10 may confirm the normal state, including confirming that the transmission source is the representative number management device 10 (10A).

Thus, each of the number management devices (blockchain constitution devices) 10 of the number management system 1 according to modification example 2 of the present embodiment can store not only the number portability information on the telephone numbers managed by the number management device, but also the number portability information of all members (such as the carriers) that participate in the blockchain. Thus, it is possible to improve availability of the number portability information that is used in the ENUM system. Further, for example, it is possible to reduce processing load and communication load in an entire system because it is not necessary to deal with the problem (ordering properties, consistency, and atomic properties) of agreement formation of the distributive system caused when a plurality of block proposal units 13 are present in the blockchain.

MODIFICATION EXAMPLE 3

Next, modification example 3 of the number management system 1 according to the present embodiment will be described.

The number management system 1 (see FIG. 1) according to the present embodiment is based on the Permissioned type blockchain in which services using a blockchain are used by limited members, rather than the public blockchain in which anyone can participate. In this case, a member capable of transmitting the number update request to the number management device 10 is assumed to be the carrier to which the telephone number is issued by the Ministry of Internal Affairs and Communications. In the future, however, a case in which a number is directly issued to users by the Ministry of Internal Affairs and Communications may also occur. In this case, the target of "Permissiond" may include a user to which a number is issued by the Ministry of Internal Affairs and Communications.

Thus, a number management system according to modification example 3 has a configuration in which not only a carrier but also a specific user (a user terminal) can transmit a number update request to the number management device 10. Further, when the number management device 10 includes a function of the ENUM server, the number management device 10 may directly receive an inquiry about the connection destination information corresponding to the telephone number directly from the user terminal without involving the SIP server of the carrier to resolve the number.

As described above, with the number management system 1, the number management method, and the number management device 10 according to the present embodiment, it is possible to improve availability of the number portability information that is used in the ENUM system. Further, it is possible to lower an entry barrier to a telephone network for a small-scale carrier.

The number management system 1, the number management method, and the number management device 10 according to the present invention are not limited to the embodiment or the modification examples described above and can be modified without departing from the spirit of the present invention.

For example, in the present embodiment, the number portability information has been described as a set of a telephone number and changed connection destination information (accommodation carrier information). In addition, a set of the telephone number, accommodation carrier information before changing, and changed accommodation carrier information may constitute the number portability information. In this case, it is possible to achieve the same effects as those of the present embodiment.

REFERENCE SIGNS LIST 1, 1a, 1b Number management system
10 (10A, 10B, 10C) Number management device
11 Request reception unit
12 Transaction generation unit
13 Block proposal unit
14 Block approval unit
15 Number portability information transmission unit
20 ENUM server
21 Number resolution processing unit
22 Data updating unit
23 Number database (DB)

The invention claimed is:

1. A number management system including a plurality of communicatively connected number management devices and configured to manage, as a blockchain, number portability information including a telephone number and connection destination information of the telephone number,
wherein each of the number management devices comprises:
a request reception unit configured to receive a number update request including receiving the number portability information;
a transaction generation unit configured to generate a transaction for managing the received number portability information in the blockchain;
a block proposal unit configured to acquire each of a plurality of transactions generated in response to a plurality of the number update requests, generate a block to be newly proposed including a transaction group obtained by aggregating the plurality of acquired transactions, and transmit the generated block to be proposed to each of the plurality of number management devices constituting the blockchain; and
a block approval unit configured to receive the block to be proposed, approve the block to be proposed by confirming a predetermined normal state of the block to be proposed, and store the block to be proposed in a storage unit, with the block to be proposed connected to the block stored as the blockchain; and
a number portability information transmission unit configured to extract the number portability information of the plurality of transactions included in the block to be proposed, generate and transmit a number information update request including the extracted number portability information, and receive a number information update response to the number information update request indicating an update to the number portability information.

2. The number management system according to claim 1, wherein the block proposal unit calculates a hash value by using the transaction group included in a most recent block among the blocks stored as the blockchain in the storage unit, and generates the block to be proposed further including the calculated hash value, and
when the block approval unit receives the block to be proposed, the block approval unit calculates a hash value by using the transaction group included in the most recent block stored in the storage unit of the number management device to which the block approval unit belongs and confirms the predetermined normal state through a match between the calculated hash value and a hash value included in the received block to be proposed.

3. The number management system according to claim 1, wherein a representative number management device is set from among the plurality of number management devices,
the representative number management device includes the block proposal unit and the number management devices other than the representative number management device do not include the block proposal unit, and
when the transaction generation unit of one of the other number management devices generates the transaction, the transaction generation unit transmits the transaction to the block proposal unit of the representative number management device.

4. The number management system according to claim 1, wherein each of the plurality of number management devices is communicatively connected to an E.164 Number Mapping (ENUM) server of a carrier to which the number management device belongs, and
each of the plurality of number management devices further includes a number portability information transmission unit configured to transmit, to the ENUM server, the number portability information indicated by the transaction group included in the block to be proposed stored in the storage unit.

5. A number management method for a number management system including a plurality of communicatively connected number management devices and configured to manage, as a blockchain, number portability information including a telephone number and connection destination information of the telephone number,
wherein each of the number management devices executes:
receiving a number update request including receiving the number portability information; and
generating a transaction for managing the received number portability information in the blockchain and transmitting the generated transaction to one of the plurality of number management devices determined on a basis of a predetermined logic,
wherein the one of the plurality of number management devices executes receiving each of a plurality of transactions generated in response to a plurality of the number update requests, generating a block to be newly proposed including a transaction group obtained by aggregating the plurality of received transactions, and transmitting the generated block to be proposed to each of the plurality of number management devices constituting the blockchain,
wherein each of the plurality of number management devices executes receiving the block to be proposed, approving the block to be proposed by confirming a predetermined normal state of the block to be proposed, and storing the block to be proposed in a storage unit, with the block to be proposed connected to the block stored as the blockchain, and
wherein each of the plurality of number management devices executes extracting the number portability information of the plurality of transactions included in the block to be proposed, generating and transmitting a number information update request including the extracted number portability information, and receiving a number information update response to the number information update request indicating an update to the number portability information.

6. A number management device of a number management system including a plurality of communicatively connected number management devices and configured to manage number portability information including a telephone number and connection destination information of the telephone number as a blockchain,
wherein the number management device comprises:
a request reception unit configured to receive a number update request including receiving the number portability information;
a transaction generation unit configured to generate a transaction for managing the received number portability information in the blockchain;
a block proposal unit configured to acquire each of a plurality of transactions generated in response to a plurality of the number update requests, generate a block to be newly proposed including a transaction group obtained by aggregating the plurality of acquired transactions, and transmit the generated block to be proposed to each of the plurality of number management devices constituting the blockchain;

a block approval unit configured to receive the block to be proposed, approve the block to be proposed by confirming a predetermined normal state of the block to be proposed, and store the block to be proposed in a storage unit, with the block to be proposed connected to the block stored as the blockchain, and a number portability information transmission unit configured to extract the number portability information of the plurality of transactions included in the block to be proposed, generate and transmit a number information update request including the extracted number portability information, and receive a number information update response to the number information update request indicating an update to the number portability information.

* * * * *